United States Patent
Streuber (10) Patent No.: US 9,354,052 B2
(45) Date of Patent: May 31, 2016

(54) SHARED-APERTURE ELECTRO-OPTIC IMAGING AND RANGING SENSOR

(71) Applicant: Raytheon Company, Waltham, MA (US)

(72) Inventor: Casey T. Streuber, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 325 days.

(21) Appl. No.: 14/163,487

(22) Filed: Jan. 24, 2014

(65) Prior Publication Data

US 2015/0211849 A1    Jul. 30, 2015

(51) Int. Cl.
  *G01C 3/08* (2006.01)
  *F41G 7/26* (2006.01)
  *G01B 11/25* (2006.01)

(52) U.S. Cl.
  CPC ... *G01C 3/08* (2013.01); *F41G 7/26* (2013.01); *G01B 11/25* (2013.01)

(58) Field of Classification Search
  CPC ............. F41G 7/26; G01C 3/08; G01B 11/25
  USPC ..................................................... 356/4.01
  See application file for complete search history.

(56) References Cited

U.S. PATENT DOCUMENTS

| | | | | |
|---|---|---|---|---|
| 8,305,485 | B2* | 11/2012 | Kane | G06T 7/0059 348/176 |
| 2002/0196980 | A1* | 12/2002 | Dowski, Jr. | G02B 27/50 382/232 |
| 2009/0090868 | A1* | 4/2009 | Payne | G01T 1/295 250/363.06 |
| 2013/0211657 | A1* | 8/2013 | Zeng | G01S 17/58 701/28 |
| 2015/0377590 | A1* | 12/2015 | Roncone | F41G 7/008 244/3.16 |

OTHER PUBLICATIONS

Edward Dowski et al., "Single-lens single-image incoherent passive-ranging systems" Applied Optics vol. 33, No. 29, pp. 6762-6773 Oct. 10, 1994.
Anat Levin et al. "Image and depth from a conventional camera with a coded aperture," ACM Transactions ons on Graphics (TOG) 26.3 (2007): 70.
Gregory Johnson et al., "Passive ranging through wave-front coding: information and application" Applied Optics vol. 39, No. 11, pp. 1700-1710 Apr. 10, 2000.

* cited by examiner

*Primary Examiner* — Mark Hellner
(74) *Attorney, Agent, or Firm* — Eric A. Gifford (57) ABSTRACT

A shared-aperture EO imaging and ranging sensor is implemented by time multiplexing an optical imaging channel and an optical ranging channel. The optical ranging channel is allocated the "unused portion" of each frame; that portion of the frame that is reserved from electronics processing of the imaging channel. The electronics processing of ranging channel is performed during the integration period of the next frame. This allows ranging to be provided without sacrificing the performance of the imaging channel. Ranging may be provided using either "coded aperture" or "wavefront coding".

20 Claims, 10 Drawing Sheets

SHARED-APERTURE ELECTRO-OPTIC IMAGING AND RANGING SENSOR

BACKGROUND OF THE INVENTION

1. Field of the Invention

This invention relates to electro-optic sensors that provide both imaging and range sensing.

2. Description of the Related Art

Electro-optic (EO) sensors detect optical radiation emanating from one or more objects in a scene to form an image of those objects. The optical radiation may be emitted from or reflected off of the objects. EO sensors span an electromagnetic band including UV, visible, NIR, SWIR, MWIR and LWIR spectrums. The images are typically processed to estimate a line-of-sight (LOS) angle to one or more objects. The image may also be processed to extract other information about the object in order to discriminate or classify objects.

In certain applications it would be useful to augment the standard imaging function with accurate range information. The ranging function may be provided by an auxiliary active optical target detector such as a laser rangefinder. The laser reflects an optical pulse off the of the object and a detector determines the time of flight to estimate the range. Although effective, the active system is costly. Another approach is to use multiple apertures to make parallax measurements to provide the range estimate. Although passive this approach suffers from degraded accuracy and a difficult calibration process.

Another approach, commonly referred to as "coded aperture" uses a patterned aperture stop to modulate the wavefront to form an image having distinct spatial frequency components at the detector. Accurate range information can be extracted from the structure of the image (usually the spatial frequency components of the image are compared). However, the range estimates are typically only accurate over a 4× dynamic range. An image of an object (a local region of the scene) can be reconstructed from the image of the modulated waveform. The imaging function does suffer from an approximately 50% loss due to the patterned aperture stop and noise associated with the reconstruction process. Different spatial spatterns ("codes") will perform better for the ranging function or the imaging function. Typically, a spatial pattern is selected that provides an adequate balance of the two functions. A complete explanation of the technique for simultaneous imaging and passive range detection using "coded aperture" is provided in the following references: Edward Dowski and W. Thomas Cathey "Single-lens single-image incoherent passive-ranging systems" APPLIED OPTICS Vol. 33, No. 29, pp. 6762-6773 10 Oct. 1994; Levin, Anat, et al. "Image and depth from a conventional camera with a coded aperture." *ACM Transactions on Graphics (TOG)* 26.3 (2007): 70 and Gregory Johnson et al. "Passive ranging through wave-front coding: information and application" APPLIED OPTICS Vol. 39, no. 11, pp. 1700-1710 10 Apr. 2000, which are hereby incorporated by reference.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a shared-aperture EO imaging and ranging sensor by time multiplexing an optical imaging channel and an optical ranging channel. The optical ranging channel is allocated the "unused portion" of each frame; that portion of the frame that is reserved from electronics processing of the imaging channel. The electronics processing of ranging channel is performed during the integration period of the next frame. This allows ranging to be provided without sacrificing the performance of the imaging channel.

The optical ranging channel includes an adaptive optical modulator configured to optically modulate the amplitude or phase of the incident wavefront with a spatial pattern ("code"). The spatial pattern is configured such that objects in the scene within a certain range window produce image components having a distinct spatial structure sensitive to the range within the range window. Each distinctive spatial structure maps to a particular range estimate to the one or more objects in the range window with high accuracy. A detector converts the optical radiation of an optical image of the modulated wavefront into an electrical signal. This signal is processed to determine the spatial structure to provide an estimate of range to one or more objects.

The adaptive optical modulator may be configured to modulate the wavefront with at least two different spatial patterns associated with two different range windows during the unused portion of the frame or in successive frames. Possible modulators include reflective DMD (amplitude), transmissive LCD (amplitude or phase) or filter wheel (amplitude or phase). These spatial patterns may be selected to optimize range estimation without regard for image reconstruction. The spatial patterns and the sequence of presentation may be determined a priori or they may be determined based on image or range attributes. The range estimate and error for one spatial pattern may be used to select the next spatial pattern and range window. Image attributes that characterize an object may be used to select a set of spatial patterns optimized for that type of object.

The time multiplexing of the imaging and ranging involves at least two variants on optical switching; channel switching to direct the optical radiation to either the imaging or ranging channels and optical modulation to modulate the waveform to provide the range estimate. The optical modulation must be performed at or near the shared aperture or a relayed version thereof. Channel switching may be performed either at or near the shared aperture or a relayed version thereof or at or near the image plane or a relayed version thereof. A third variant on optical switching involves local scene selection in which local portions of the scene are either transmitted or blocked. For example, local scene selection may only transmit the optical radiation corresponding to a particular object. Local scene selection must be performed at or near the image plane.

The imaging and ranging channels may be either physically separate channels or a shared channel. In an embodiment of physically separate channels, an optical switch at the image plane alternately directs the optical radiation to the optical imaging channel for its integration period and then directs the optical radiation to the optical ranging channel for the remaining unused portion of the frame. To implement local scene selection, the optical switch is a spatial light modulator that performs both the channel switching and local scene selection functions. In an embodiment of a shared channel, the adaptive optical modulator performs both channel switching and waveform modulation functions. The adaptive optical modulator may be configured to provide some type of image filtering during the integration period. To implement local scene selection, an additional spatial light modulator is positioned at the image plane.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a shared-aperture EO imaging and ranging sensor by time multiplexing an optical imaging channel and an optical ranging channel. The channels may be passive (radiation emitted from objects in the scene) or semi-active (radiation from a designator reflected off of the object in the scene). The optical ranging channel is allocated the "unused portion" of each frame; that portion of the frame that is reserved from electronics processing of the imaging channel. The electronics processing of ranging channel is performed during the integration period of the next frame. This allows ranging to be provided without sacrificing the performance of the imaging channel.

The optical ranging channel includes an adaptive optical modulator configured to optically modulate the amplitude or phase of the incident wavefront with a spatial pattern (or "code"). Amplitude modulation is referred to as either "coded aperture" or "pupil apodization". Phase modulation is referred to as "wavefront coding". The spatial pattern is configured such that objects in the scene within a certain range window produce image components having a distinct spatial structure sensitive to the range to the one or more objects within the range window. Each distinctive spatial structure maps to a particular range estimate to the one or more objects in the range window with high accuracy. A detector converts the optical radiation of an optical image of the modulated wavefront into an electrical signal. This signal is processed to determine the spatial structure to provide a range estimate to one or more objects. The adaptive optical modulator may be configured to modulate the wavefront with at least two different spatial patterns associated with two different range windows during the unused portion of the frame or in successive frames.

Figure 1:
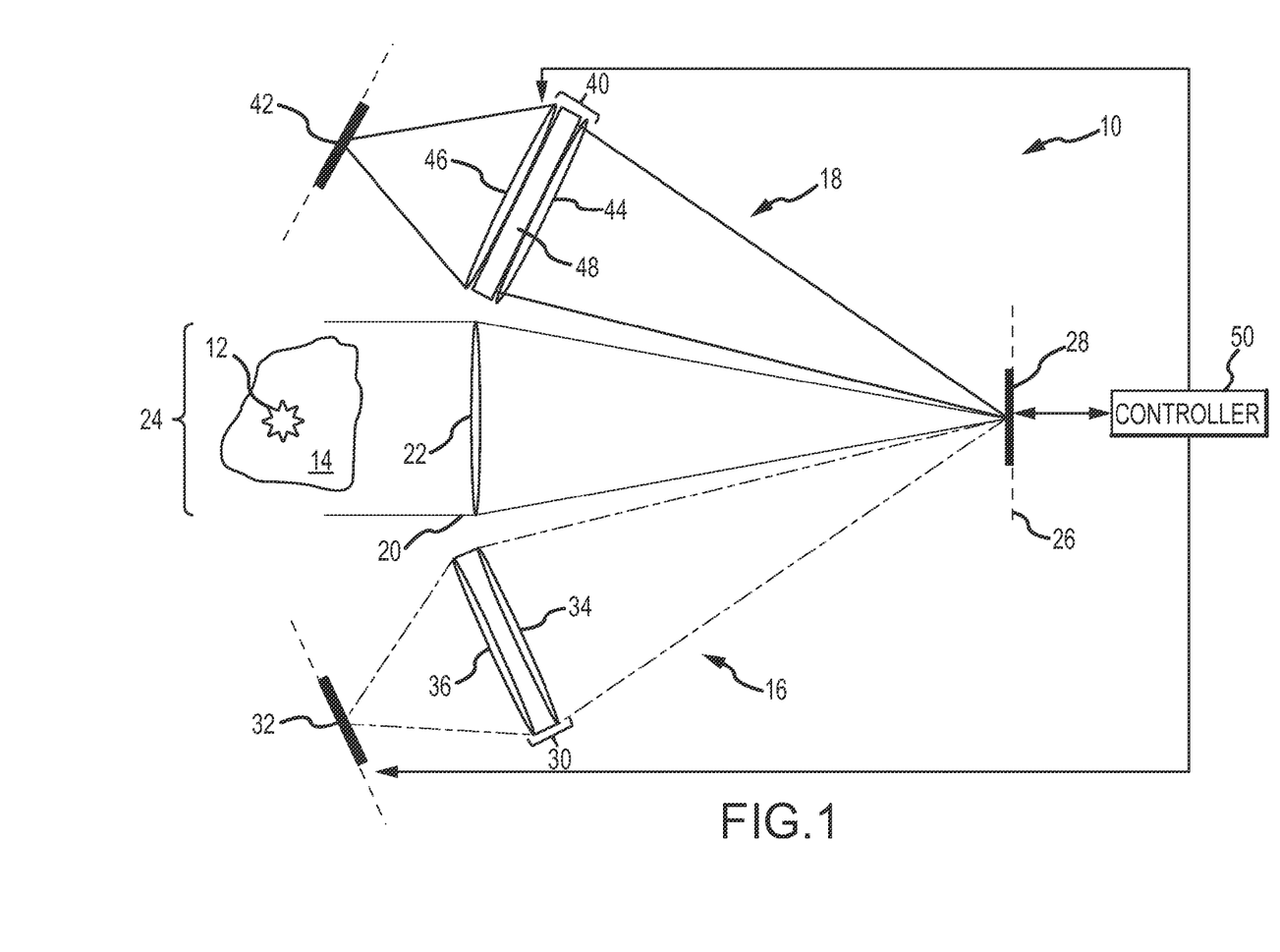
FIG. 1 is a diagram of an embodiment of a shared-aperture electro-optic imaging and ranging sensor.

As shown in FIG. 1, an embodiment of a shared-aperture electro-optic (EO) imaging and ranging sensor 10 is configured to time multiplex the optical radiation from one or more objects 12 in a scene 14 between physically separate optical imaging and optical ranging channels 16 and 18, respectively. EO sensor 10 comprises a shared-aperture 20 including an objective optical system 22 that receives a wavefront of optical radiation emanating from the one or more objects 12 in scene 14 within a field of view (FOV) 24 and converts the wavefront into a first optical image at an image plane 26. The wavefront arrives at the shared aperture 20 as a ray bundle representing the object. The angle at which the rays arrive at the shared-apertures determines the spatial position in the image plane 26.

An optical switch 28 is positioned at or near image plane 26. This allows the optical radiation to be temporally switched between the optical imaging channel 16 and the optical ranging channel 18 to time multiplex the FOV in a sequence of frames. Optical switch 28 may be configured to switch the entire FOV between the two channels, the "channel switching" function. In addition, optical switch 28 may be further configured to perform a spatial modulation of the image that is transmitted to either channel, the "local scene selection" function. In particular, the optical switch 28 may be configured to selectively transmit or block certain local regions of the FOV. For example, in a scene containing multiple tracked objects, the optical switch 28 may be configured to isolate and transmit only a single object at a time. This improves the downstream detection and processing in both the imaging and ranging channels. The optical switch 28 may be implemented, for example, with a spatial light modulator (SLM) such as a reflective digital micromirror device (DMD) or a transmissive liquid crystal device (LCD). The various possibilities for encoding the imaging channel using a SLM are disclosed in detail in co-pending U.S. patent application Ser. No. 13/872,617 entitled "Time-Multiplexed Broadband and Multi-Filtered Electro-Optic Sensor", filed Apr. 29, 2013 and U.S. patent application Ser. No. 13/768,78 entitled "Digitally Scanned Multi-Cell Electro-Optic Sensor", filed Feb. 15, 2013, which is hereby incorporated by reference.

Optical imaging channel 16 comprises a relay optic 30 to relay the image to a detector 32 positioned at or near a relayed version of the image plane 26. Relay optic 30 comprises a collimating optic 34 and a focusing optic 36 positioned at or near a relayed version of the shared-aperture. Detector 32 is configured to convert the optical radiation of the optical image into a first electrical signal. Detector 32 may, for example, be a pixelated imaging detector (e.g. 128×128, 256× 256, or 640×480 pixels, etc.), or may be a quad-cell detector that outputs a line-of-sight (LOS).

Optical ranging channel 18 comprising a relay optic 40 to relay the image to a detector 42 positioned at or near a relayed version of the image plane 26. Relay optic 40 comprises a collimating optic 44 and a focusing optic 46 positioned at or near a relayed version of the shared-aperture. Detector 42 is configured to convert the optical radiation of a spatially modulated optical image into a second electrical signal. Detector 42 may, for example, be a pixelated imaging detector (e.g. 128×128, 256×256, or 640×480 pixels, etc.).

An adaptive optical modulator 48 is positioned between collimating optic 44 and focusing optic 46 at or near the relayed version of the shared-aperture. Possible modulators include reflective DMD (amplitude), transmissive LCD (amplitude or phase) or filter wheel (amplitude or phase). Adaptive optical modulator 48 is configured to optically modulate the amplitude or phase of the wavefront from the shared-aperture with a spatial pattern ("code"). The spatial pattern is configured such that objects in the scene within a certain range window produce image components having a distinct spatial structure sensitive to the range to the one or more objects within the range window. Each distinctive spatial structure maps to a particular range estimate to the one or more objects in the range window with high accuracy. If the object is outside the certain range window, the modulated wavefront will produce similar spatial structures that are difficult to distinguish leading to a rapid degradation of the range estimate.

To understand the principle, consider that the wavefront emanating from an object arrives at the shared-aperture as a ray bundle representing the object. The angle at which the rays arrive at the shared-aperture determine their spatial position at or near the image plane of the shared-aperture optical system. Real objects are not point objects, hence they include portions that are at different distances from the shared-aperture. The ray bundle from one part may focus exactly at the image while the ray bundle from another part may be slightly defocused at the image plane. The difference in optical blur between the focused and defocused portions are relatively small and estimation techniques that rely on measuring these difference have large estimation errors. The "coded aperture" or "wavefront modulation" techniques increase the difference in spatial frequency content for a certain range window from the shared-aperture. Different ranges-to-object within the range window produce distinctive spatial structure that can be identified to estimate the range.

One or more controllers 50 are configured to control optical switch 28 and adaptive optical modulator 48 and to process the electrical signals from detectors 32 and 42, respectively, to provide an electrical representation of the image (e.g. a LOS to an object or other attributes of the object) and a range estimate to the object. The one or more controllers 50 are configured to control the optical switch 28 to direct the optical radiation to the optical imaging channel 16 for a portion of each frame, said portion corresponding to an integration period for the optical imaging channel 16 and process the resulting electrical signal during the remaining portion of each frame to provide an electronic representation of the optical image of the incident wavefront. The one or more controllers 50 are configured to control the optical switch 28 to direct the optical radiation to the optical ranging channel 28 during the remaining portion of each frame, configure the adaptive optical modulator 48 to modulate the relayed wavefront with the selected spatial pattern, and process the resulting electrical signal during the integration period of the next frame to determine the spatial structure of the image components in the second optical image to provide a range estimate to the one or more objects. Nominally this is done by taking the Fourier transform of the electric signals and correlating the spatial frequency response to a pre-calibrated range, a version of a "matched filter". The one or more controllers are configured to control the adaptive optical modulator 48 to modulate the wavefront with at least two different spatial patterns associated with two different range windows during the remaining portion of a frame or in successive frames thereby effectively expanding the range window in which highly accurate range estimates can be made.

These spatial patterns may be selected to optimize range estimation without regard for image reconstruction since the imaging is performed in a different time multiplexed channel. The spatial patterns and the sequence of presentation may be determined a priori (such as in a filter wheel) or they may be determined in real-time based on image or range attributes as implemented by a spatial light modulator. The range estimate and error for one spatial pattern may be used to select the next spatial pattern and range window. Image attributes that characterize an object may be used to select a set of spatial patterns optimized for that type of object.

The controllers may be configured to output each range estimate with its error or it may be configured to only output the range estimates that lie within the range window and exhibit an error less than a certain threshold. The controllers may be configured to extract a LOS estimate from image representation and pair the LOS and range estimates as an output. If the front end optical switch is configured to track and select a single object at a time, the output may include a pair LOS estimate and range estimate for a first object, a second object and so forth in a time sequence.

The one or more controllers may be configured to initially set the portion of each frame corresponding to the integration period for the optical imaging channel to a maximum period and to reduce that portion as the range estimate to the one or more objects is reduced while maintaining at least a minimum SNR in the electronic representation of the optical image. For example, the integration period may start at approximately 50% and be reduced to approximately 2-3% as the range to object closes.

Figure 2A:
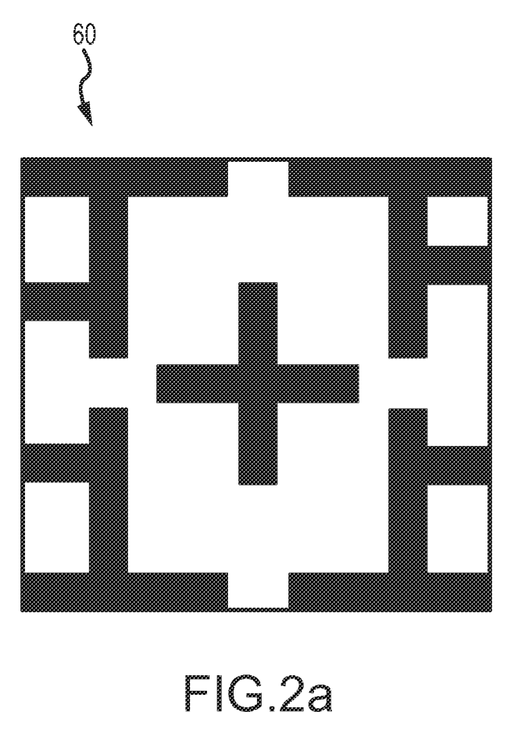
FIGS. 2*a* and 2*b* are diagrams of two different amplitude spatial patterns for coded aperture modulation.
Figure 2B:
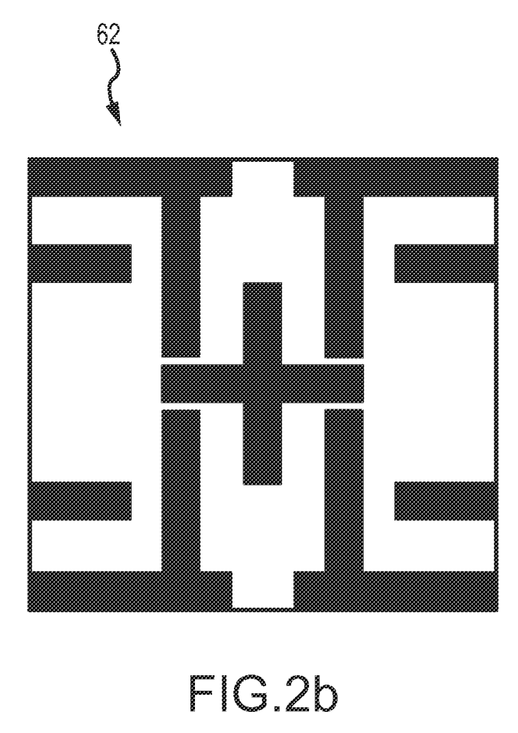

FIGS. 2a and 2b depict an embodiment of two different spatial patterns 60 and 62 for amplitude modulation of a wavefront. The two spatial patterns provide accurate range information in two different range windows. Using "coded aperture" techniques a range window is approximately 4X where "X" is the lower bound of the window. For example, if X=16 meters the range is approximately 16 to 64 meters. Typically, the boundaries of the range window are set at the point where the estimate errors intersect with an adjacent 4X window. For example, at 16 meters a 4-16 m and 16-64 m window have the same error. At ranges outside the 4× range window the spatial structure is hard to distinguish and the estimation error increases rapidly. These patterns, which can be determined by any number of known methods (see Levin, Anal, et al. "Image and depth from a conventional camera with a coded aperture." *ACM Transactions on Graphics (TOG)* 26.3 (2007): 70) are then calibrated and pre-loaded into the sensor's memory. Typical methods for pattern determination involve optimization algorithms that assume properties of the typical scene encountered and use some form of an iterative inverse problem solution.

Figure 3A:
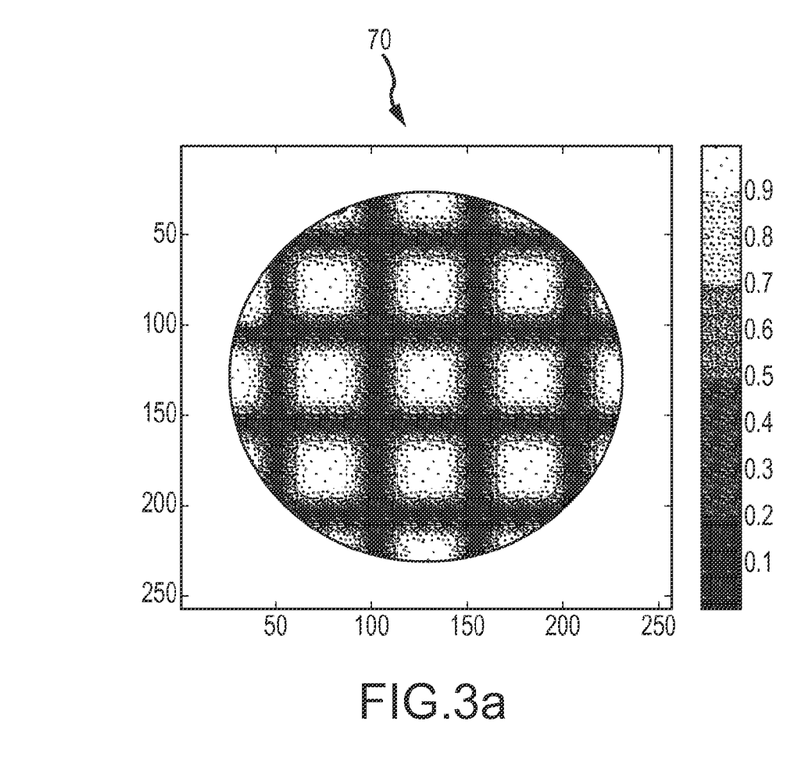
FIGS. 3*a* and 3*b* are diagrams of two different phase spatial patterns for waveform modulation.
Figure 3B:
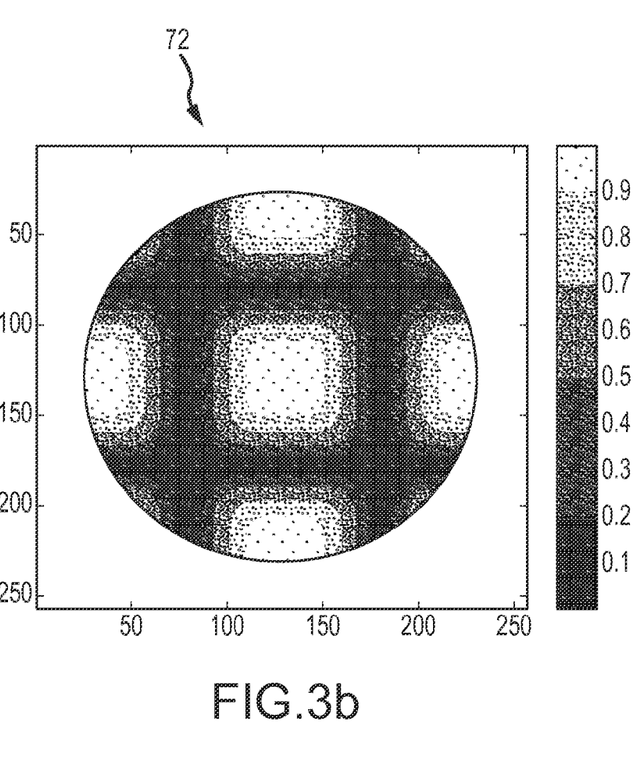

FIGS. 3a and 3b depict an embodiment of two different spatial patterns 70 and 72 for phase modulation of a wavefront. The two spatial patterns provide accurate range information in two different range windows. These phase patterns can also be determined via the above methods. A particularly useful phase profile is cosinusoidal, where the frequency of the phase modulation provides an easily modified parameter that is sensitive to range estimation accuracy for different range bins. In this case the estimation accuracy is directly related to the f/# of the system and the frequency of the phase modulation, providing a simple mechanism for adaptively modulating the range sensitivity.

Figure 4:
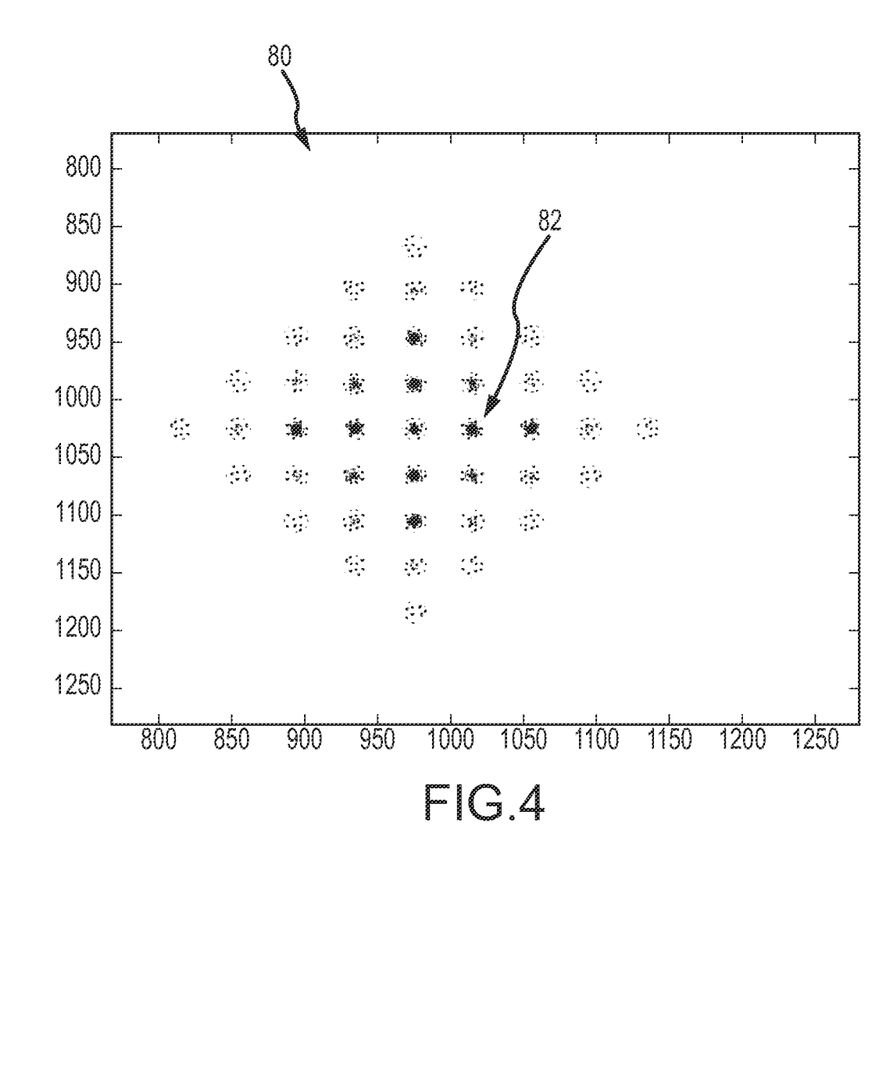
FIG. 4 is a diagram of an image of a modulated waveform.

FIG. 4 depicts an image 80 of an ideal point object whose wavefront is modulated using a cosinusoidal phase pattern and whose range lies within the range window associated with that pattern. Image 80 includes image components having a distinct spatial structure sensitive to the range to the ideal point object. In this case, the spacing between the discrete spots 82 changes with range as long as the range stays within the range window. Therefore, a range estimate can be accurately calculated based on the spacing. In general, real objects comprised of multiple point objects and/or different spatial patterns will produce distinct spatial structure at different ranges across the range window.

Figure 5:
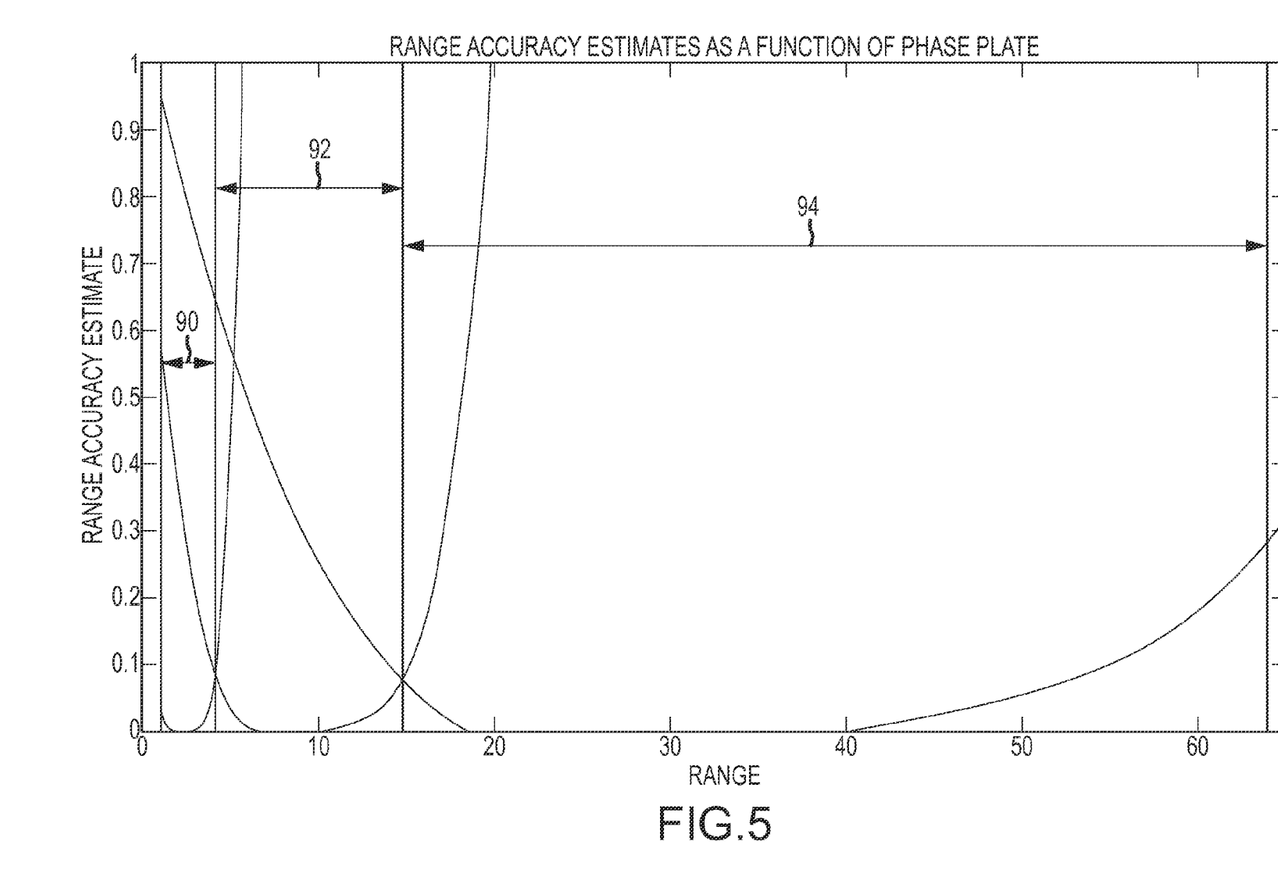
FIG. 5 is a plot range estimate error versus range for three different spatial patterns.

FIG. 5 depicts three different range windows 90, 92 and 94 corresponding to three different phase modulation profiles. Each range window spans approximately a 4× change in range to the object. Together the three modulation profiles provide accurate range estimates for a 64× change in range to the object. On one embodiment, the adaptive optical modulator is configured to modulate the wavefront with each of the different phase modulation profiles to generate range estimates. The controller may output each range estimate together with its error. Alternately, the controller may output the most accurate range estimate. If the modulator is configurable such as an SLM, the controller may evaluate the range estimate and error for a first modulation profile and use that information to select the next profile.

Figure 6:
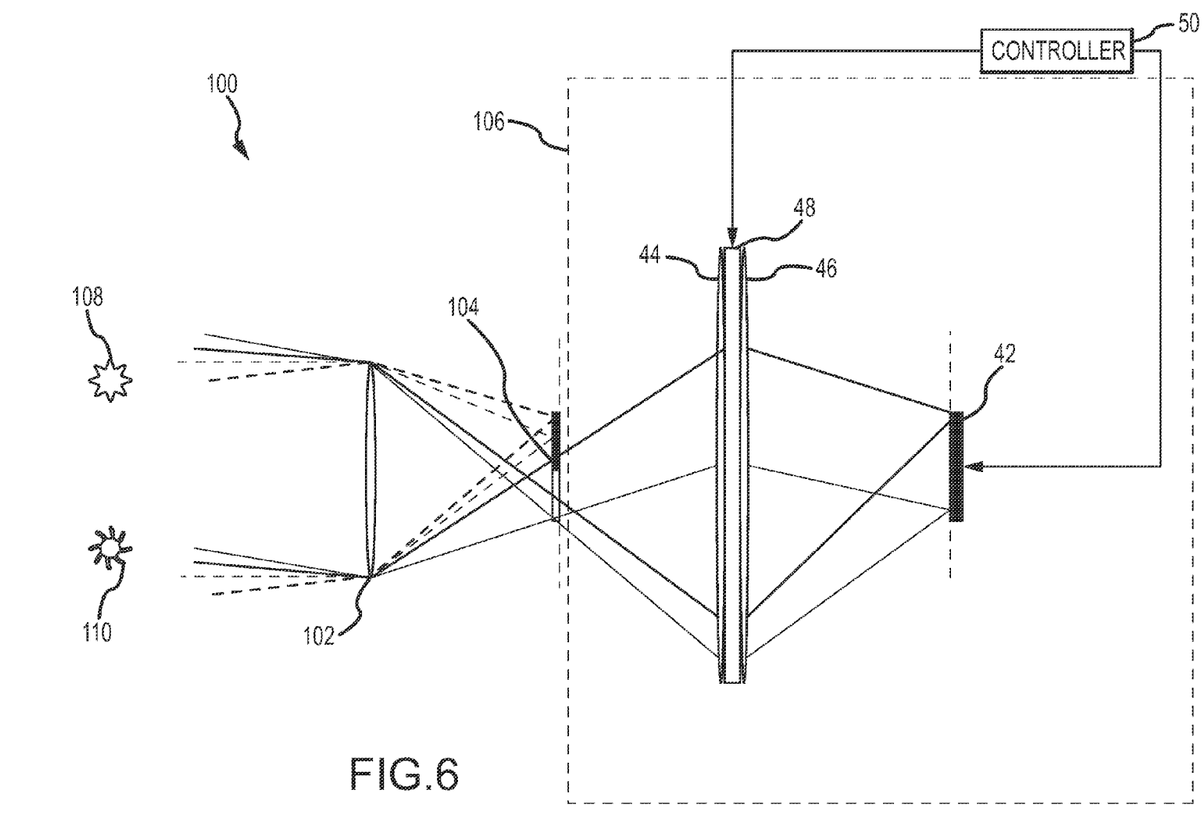
FIG. 6 is a diagram of another embodiment of a shared-aperture electro optic imaging and ranging sensor in which the optical switch is implemented with a spatial light modulator.

FIG. 6 depicts an embodiment of an EO sensor 100 comprising a shared-aperture 102, an SLM-based optical switch 104 and an optical ranging channel 106. The optical imaging channel is not shown. As shown the scene includes a pair of objects 108 and 110. The ray bundles from object 108 are depicted with solid lines while the ray bundle from object 110 are depicted with dashed lines. These ray bundles overlap in the image and would corrupt the range estimate. However, SLM-based optical switch 104 can alternately block one of the two objects (or all of the scene except the desired object) during the range measurement, which improves the accuracy of the range estimate. Note, the same object-selection function can be performed during the imaging measurement to improve the imaging of the object and the calculation of certain features such as LOS.

Figure 7A:
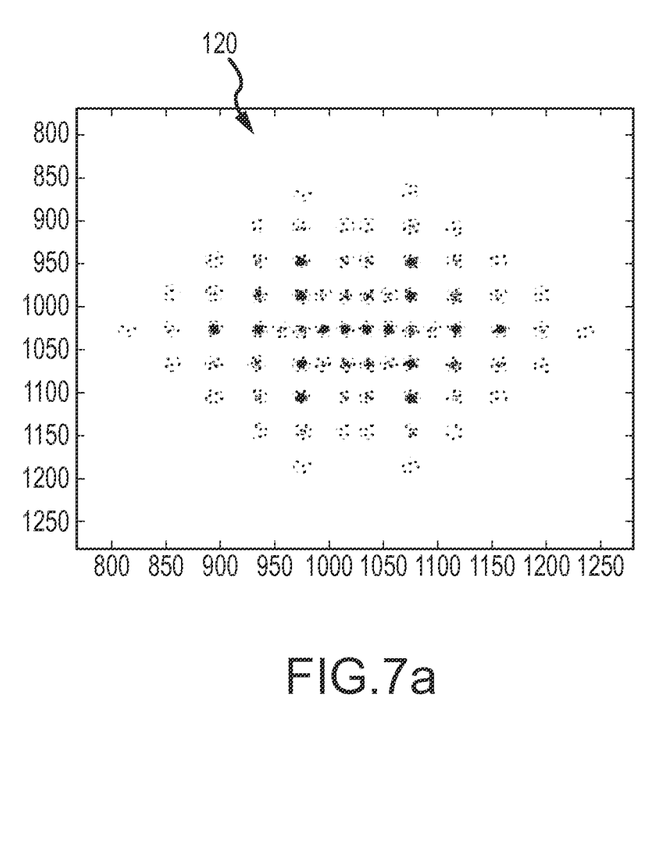
FIGS. 7*a* and 7*b* are diagrams of images of a modulated waveform for a scene with multiple objects in which the SLM passes both objects and blocks one of the objects, respectively.
Figure 7B:
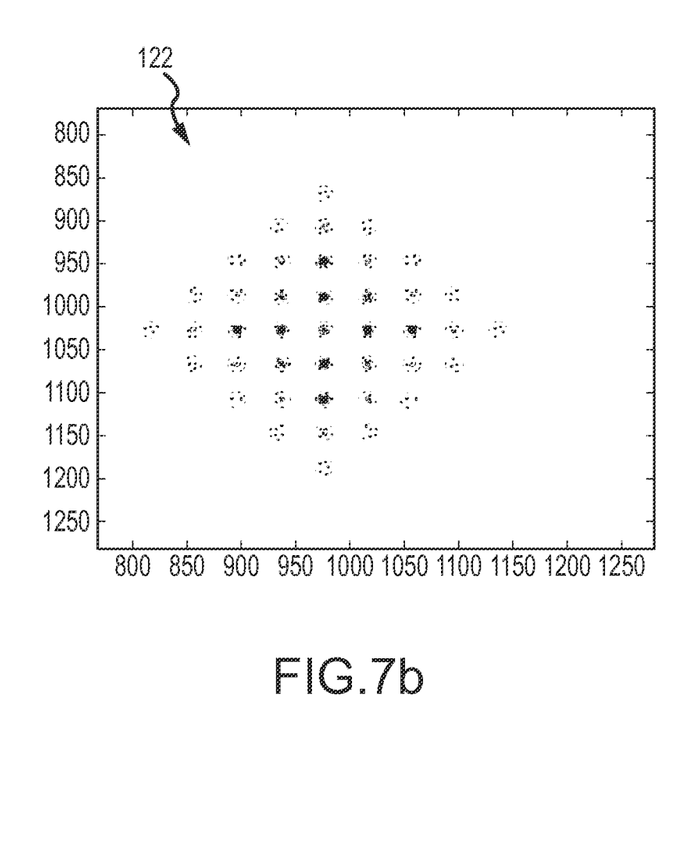

FIGS. 7a and 7b depict images 120 and 122 of a scene containing a pair of ideal point objects whose wavefront is modulated using a cosinusoidal phase pattern and whose range lies within the range window associated with that pattern. To create image 120 both objects were passed through the optical system and modulated with the phase pattern. Each object produces a distinct spatial structure in the image. However, the overlapping spatial structures create ambiguity that degrades the range estimate. To create image 122 only one of the objects was allowed to pass through the optical system to be modulated with the phase pattern, thus producing a single distinct spatial structure and a more accurate range estimate. The SLM-based optical switch 104 can time multiplex the two or more objects within the unused portion of a give frame or within successive frames.

Figure 8:
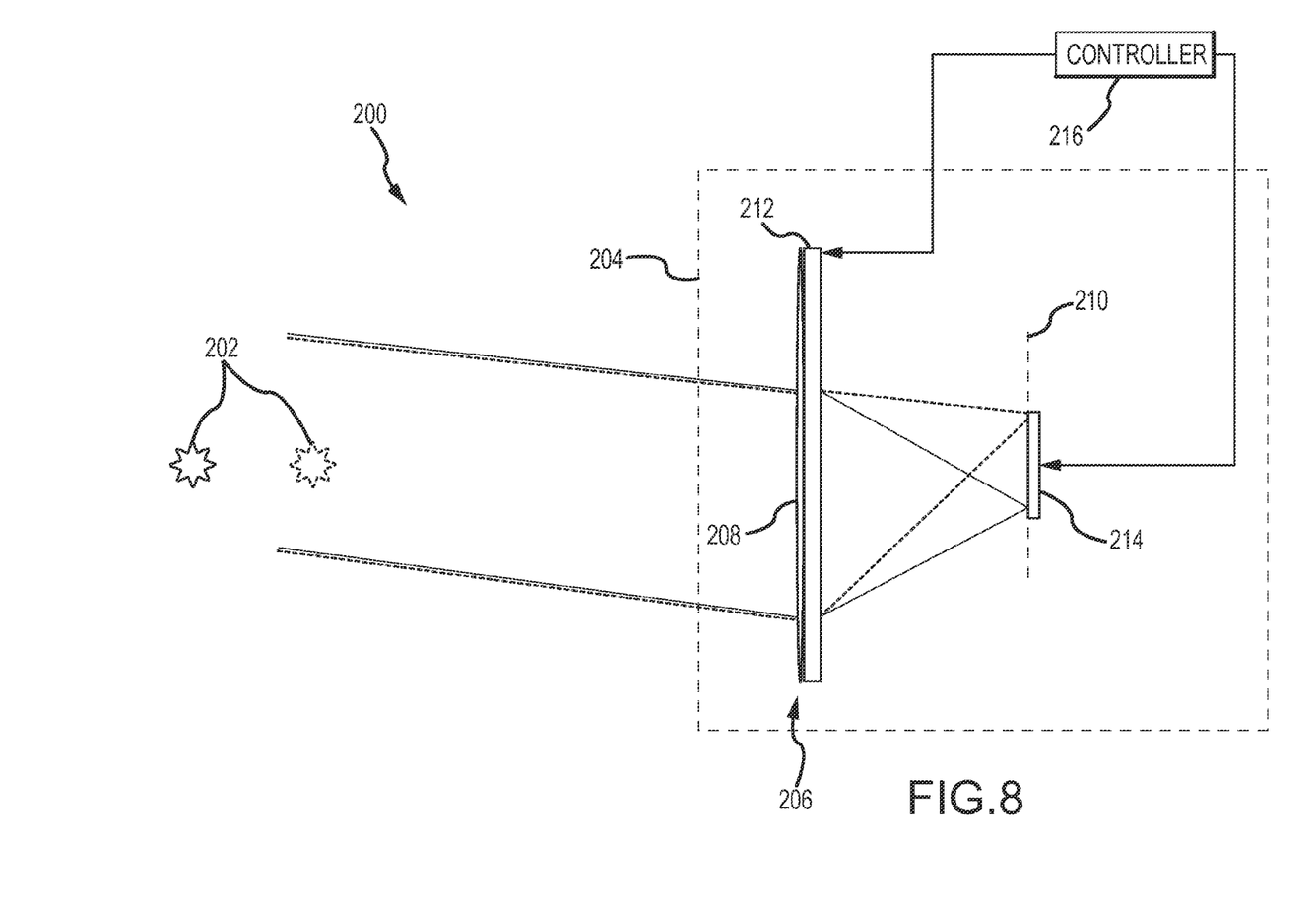
FIG. 8 is a diagram of another embodiment of a shared-aperture electro imaging and ranging sensor in which the imaging and ranging are performed in a shared optical channel.

As shown in FIG. 8, an embodiment of a shared-aperture electro-optic (EO) imaging and ranging sensor 200 is configured to time multiplex the optical radiation from one or more objects 202 in a scene between optical imaging and optical ranging channels in a shared optical channel 204. EO sensor 200 comprises a shared-aperture 206 including an objective optical system 208 that receives a wavefront of optical radiation emanating from the one or more objects 202 and converts the wavefront into a first optical image at an image plane 210. An adaptive optical modulator 212 is positioned at or near the shared-aperture 206 and an imaging detector 214 is positioned at or near image plane 210. One or more controllers 216 control adaptive optical modulator 212 to perform the channel switching and wavefront modulation functions.

In an imaging mode, the one or more controllers 216 are configured to control the adaptive optical modulator 212 to transmit the wavefront to form a first optical image at the detector for a portion of each frame corresponding to an integration period and to process the electrical signal during the remaining portion of each frame to provide an electronic representation of the first optical image.

In a ranging mode, said one or more controllers 216 are configured to control the adaptive optical modulator 212 to modulate the wavefront with a spatial pattern during the remaining portion of each frame such that objects in the scene within a certain range window associated with that spatial pattern produce image components having a distinct spatial structure in a second optical image at the detector, said distinct spatial structure sensitive to the range to the one or more objects within the range window, and to process the electrical signal during the integration period of the next frame to determine the spatial structure of the image components to provide a range estimate to the one or more objects.

Figure 9:
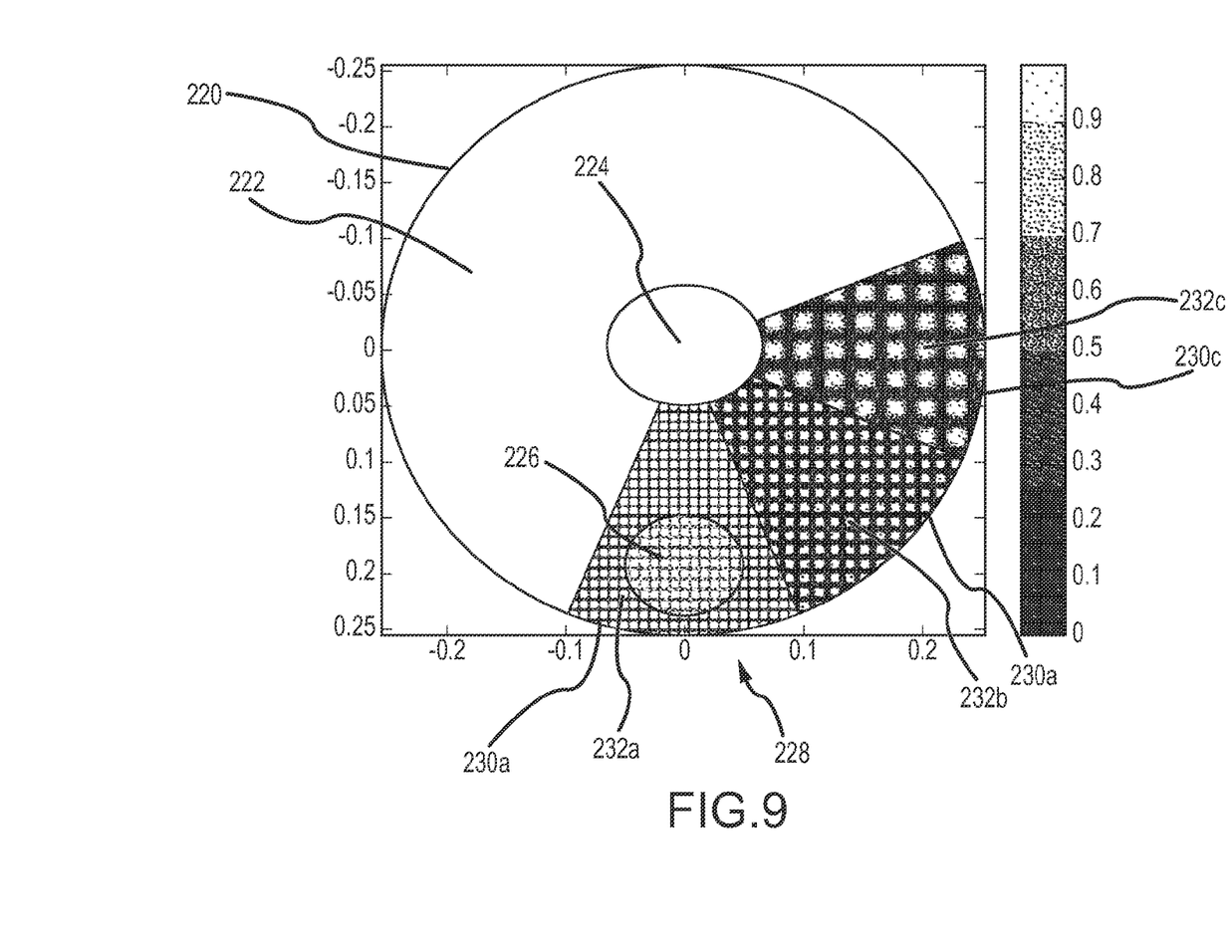
FIG. 9 is a diagram of an embodiment of a filter wheel that provides both the time multiplexing functions of the imaging and ranging channels and the modulation of the waveform in the ranging channel.

The adaptive optical modulator 212 may be implemented as a filter wheel 220 as shown in FIG. 9. In the shared-channel configuration, a large section 222 of the filter wheel is suitably configured to transmit the rays at the relayed pupil plane to provide a standard optical imaging channel. Alternately, this section may be configured to provide various types of image filtering. As shown, as the filter wheel 220 spins about the shaft 224 in the center of the disk past the relayed pupil 226, the standard imaging path utilizes approximately ⅔ of the frame rate, while the ranging path (i.e. where the wavefront's phase is modulated) utilizes approximately ⅓ of the frame rate. This is typically preferred in the case of a missile seeker due to the fact that range information is typically desired near the end of flight when target signal is large. In this way the standard imaging path is not disturbed during acquisition if the spin frequency of the filter wheel is synched to the frame rate of the imaging detector. In this case the integration time of the detector is maximized during ⅔ of the entire frame, while the last ⅓ is typically used to process the standard imaging signals. When designed appropriately the only sensitivity loss for the standard imaging system would be due to the reflectivity of the surfaces in the dynamic ranging path.

The smaller section 228 of the filter wheel is split into three sub-sections 230a, 230b and 230c each corresponding to a different spatial pattern 232a, 232b and 232c (amplitude or phase) and a different range window, allowing for accurate range estimation over an ~64× band of ranges. In this example, each spatial pattern is a phase pattern that is selected for maximum sensitivity to ranges in its particular range window. The relayed pupil 226 is delineated by the shaded region and filter wheel is rotated past this region providing four distinct periods of time in which the wavefront is modulated differently.

Figure 10:
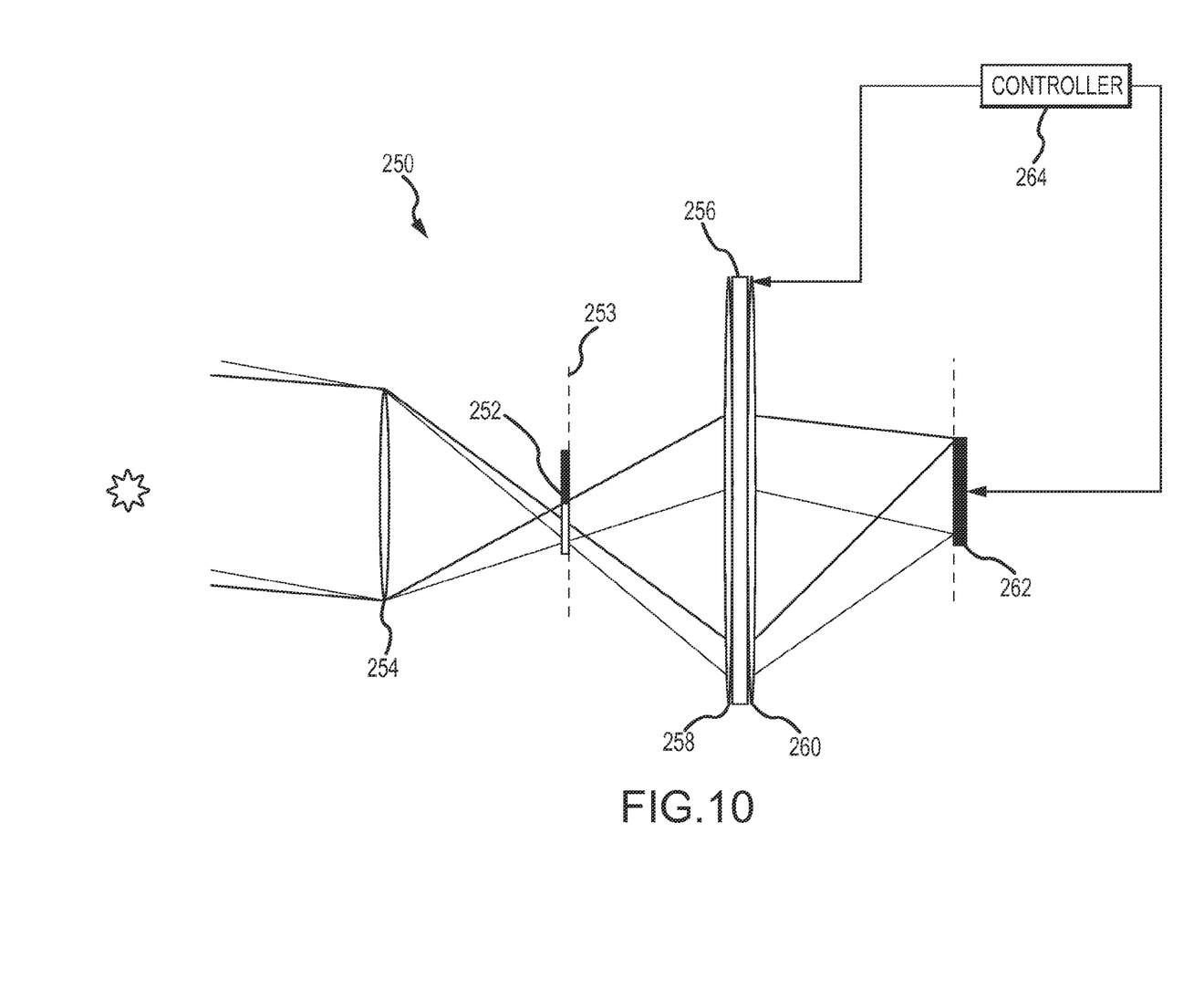
FIG. 10 is a diagram of another embodiment of a shared-aperture electro imaging and ranging sensor in which the imaging and ranging are performed in a shared optical channel.

A shared-channel configuration of a shared-aperture electro-optic (EO) imaging and ranging sensor 250 including a front-end SLM-based optical switch 252 for local scene selection is depicted in FIG. 10. SLM-based optical switch is positioned at or near the image plane 253 of shared-aperture 254. An adaptive optical modulator 256 is positioned between a collimating optic 258 and a focusing optic 260 at a relayed version of the shared-aperture. A detector 262 is positioned at or near a relayed version of the image plane. One or more controllers 264 control the SLM-based optical switch 252 and adaptive optical modulator 256 and process the electrical signals from detector 262. This configuration operates in the same imaging and ranging modes but with the added flexibility of providing local scene selection (or rejection) for either the imaging or ranging channels.

While several illustrative embodiments of the invention have been shown and described, numerous variations and alternate embodiments will occur to those skilled in the art.

Such variations and alternate embodiments are contemplated, and can be made without departing from the spirit and scope of the invention as defined in the appended claims.

I claim:

1. A shared-aperture electro-optic (EO) imaging and ranging sensor, comprising:
a shared-aperture including an objective optical system that receives a wavefront of optical radiation emanating from one or more objects in a scene within a field of view (FOV) and converts the wavefront into a first optical image;
an optical imaging channel comprising a first detector configured to convert the optical radiation of the first optical image into a first electrical signal;
an optical ranging channel comprising an adaptive optical modulator configured to optically modulate the amplitude or phase of the wavefront with a spatial pattern and a second detector configured to convert the optical radiation of a second optical image of the modulated wavefront into a second electrical signal, wherein objects in the scene within a certain range window associated with that spatial pattern produce image components in the second optical image, said image components having a distinct spatial structure sensitive to the range to the one or more objects within the range window;
an optical switch configured to alternately direct the optical radiation to the optical imaging channel and to the optical ranging channel to time multiplex the FOV in a sequence of frames; and
one or more controllers configured to
control the optical switch to direct the optical radiation to the optical imaging channel for a portion of each frame, said portion corresponding to an integration period for the optical imaging channel;
process the first electrical signal during the remaining portion of each frame to provide an electronic representation of the first optical image;
control the optical switch to direct the optical radiation to the optical ranging channel during the remaining portion of each frame; and
process the second electrical signal associated with each said spatial pattern during the integration period of the next frame to determine the spatial structure of the image components in the second optical image to provide a range estimate to the one or more objects; and
wherein said one or more controllers are configured to control the adaptive optical modulator to modulate the wavefront with at least two different spatial patterns associated with two different range windows during the remaining portion of a frame or in successive frames.

2. The EO sensor of claim 1, wherein said spatial patterns are selected to optimize sensitivity to the range to the object over the certain range window.

3. The EO sensor of claim 1, wherein said one or more controllers are configured to extract one or more features of the one or more objects from the electronic representation of the first optical image, wherein said one or more controllers are configured to use said one or more features to select the spatial patterns.

4. The EO sensor of claim 1, wherein said one or more controllers are configured to use the range estimate to select the next spatial pattern.

5. The EO sensor of claim 1, wherein said one or more controllers are configured to output the range estimate with an estimate of its accuracy.

6. The EO sensor of claim 1, wherein certain range window is approximately 4X where X is a lower bound of the window.

7. The EO sensor of claim 1, wherein said optical switch comprises a spatial light modulator configured to select local regions within the scene to direct the optical radiation from only one object in the scene at a time to the optical ranging channel, wherein said range estimate is to that only one object.

8. The EO sensor of claim 1, wherein said one or more controllers are configured to initially set the portion of each frame corresponding to the integration period for the optical imaging channel to a maximum period and to reduce that portion as the range estimate to the one or more objects is reduced while maintaining at least a minimum SNR in the electronic representation of the first optical image.

9. The EO sensor of claim 1, wherein said optical switch is positioned at or near the image plane of the shared-aperture, wherein said optical imaging channel and said optical ranging are physically separate channels.

10. The EO sensor of claim 1, wherein said optical imaging channel and said optical ranging channel are a physically shared optical channel and said first and second detectors are a shared detector, wherein said adaptive optical modulator comprises the optical switch to perform both the time multiplexing of the FOV and the modulation of the wavefront.

11. The EO sensor of claim 10, wherein the adaptive optical modulator is positioned at or near the shared aperture and the shared detector is positioned at or near the image plane.

12. The EO sensor of claim 10, further comprising a spatial light modulator positioned at or near the image plane of the shared aperture, said SLM configured to select local regions within the scene corresponding to a single object, a relay optic comprising a collimating lens and a focusing lens positioned at or near a relayed version of the shared aperture, said adaptive optical modulator positioned between said collimating and focusing lenses, said shared detector positioned at or near a relayed version of the image plane.

13. The EO sensor of claim 10, wherein the adaptive optical modulator comprises a filter wheel that rotates one rotation per frame, said filter wheel comprising a first section configured to transmit the wavefront during the integration period and a second section having at least first and second spatial patterns configured to modulate the wavefront with at least said first and second spatial patterns during the remaining portion of each frame.

14. A shared-aperture electro-optic (EO) sensor, comprising
a shared-aperture including an objective optical system that receives a wavefront of optical radiation emanating from one or more objects in a scene within a field of view (FOV) and converts the wavefront into a first optical image;
an adaptive optical modulator configurable to optically modulate the amplitude or phase of the wavefront;
a detector configured to convert optical radiation to an electrical signal; and
one or more controllers configured to time multiplex imaging and ranging modes of the FOV in a sequence of frames,
in said imaging mode, said one or more controllers configured to control the adaptive optical modulator to transmit the wavefront to form the first optical image at the detector for a portion of each frame corresponding to an integration period and to process the electrical signal during the remaining portion of each frame to provide an electronic representation of the first optical image; and in said ranging mode, said one or more controllers configured to control the adaptive optical modulator to modulate the wavefront with a spatial pattern during the remaining portion of each frame such that objects in the scene within a certain range window associated with that spatial pattern produce image components having a distinct spatial structure in a second optical image at the detector, said distinct spatial structure sensitive to the range to the one or more objects within the range window, and to process the electrical signal during the integration period of the next frame to determine the spatial structure of the image components to provide a range estimate to the one or more objects.

15. The EO sensor of claim 14, wherein said one or more controllers are configured to control the adaptive optical modulator to modulate the wavefront with at least two different spatial patterns associated with two different range windows during the remaining portion of a frame or in successive frames.

16. The EO sensor of claim 15, wherein the adaptive optical modulator comprises a filter wheel that rotates one rotation per frame, said filter wheel comprising a first section configured to transmit the wavefront during the integration period and a second section having at least first and second spatial patterns configured to modulate the wavefront with at least said first and second spatial patterns during the remaining portion of each frame.

17. The EO sensor of claim 14, further comprising a spatial light modulator positioned at or near the image plane of the shared aperture, said SLM configured to direct the optical radiation from only one object in the scene at a time to the optical ranging channel, wherein said range estimate is to that only one said object, a relay optic comprising a collimating lens and a focusing lens positioned at or near a relayed version of the shared aperture, said adaptive optical modulator positioned between said collimating and focusing lenses, said detector positioned at or near a relayed version of the image plane.

18. A shared-aperture electro-optic (EO) imaging and ranging sensor, comprising:
- a shared-aperture including an objective optical system that receives a wavefront of optical radiation emanating from one or more objects in a scene within a field of view (FOV) and converts the wavefront into a first optical image;
- an optical imaging channel comprising a first detector configured to convert the optical radiation of the first optical image into a first electrical signal;
- an optical ranging channel comprising an adaptive optical modulator configured to optically modulate the amplitude or phase of the wavefront with a spatial pattern and a second detector configured to convert the optical radiation of a second optical image of the modulated wavefront into a second electrical signal, wherein objects in the scene within a certain range window associated with that spatial pattern produce image components in the second optical image, said image components having a distinct spatial structure sensitive to the range to the one or more objects within the range window; and
- an optical switch configured to alternately direct the optical radiation to the optical imaging channel and to the optical ranging channel to time multiplex the FOV in a sequence of frames to alternately provide an electronic representation of the first optical image and a range estimate to the one or more objects.

19. The EO sensor of claim 18, wherein said adaptive optical modulator is configured to modulate the wavefront with at least two different spatial patterns associated with two different range windows during the remaining portion of a frame or in successive frames.

20. The EO sensor of claim 18, wherein said optical switch comprises a spatial light modulator configured to select local regions within the scene to direct the optical radiation from only one object in the scene at a time to the optical ranging channel, wherein said range estimate is to that only one said object.

* * * * *